United States Patent [19]

Bell, Jr.

[11] 4,071,729
[45] Jan. 31, 1978

[54] ADAPTIVE CONTROL SYSTEM AND METHOD FOR ELECTRICAL DISCHARGE MACHINING

[75] Inventor: Oliver A. Bell, Jr., Mooresville, N.C.

[73] Assignee: Colt Industries Operating Corporation, New York, N.Y.

[21] Appl. No.: 650,178

[22] Filed: Jan. 19, 1976

Related U.S. Application Data

[63] Continuation-in-part of Ser. No. 475,573, June 3, 1974, abandoned.

[51] Int. Cl.² .................................................. B23P 1/08
[52] U.S. Cl. ................................. 219/69 C; 219/69 G; 364/108; 364/474
[58] Field of Search ................. 219/69 C, 69 M, 69 P, 219/69 G; 235/151.11

[56] References Cited

U.S. PATENT DOCUMENTS

| | | | |
|---|---|---|---|
| 3,632,942 | 1/1972 | Kondo | 219/69 C |
| 3,705,969 | 12/1972 | Bell | 219/69 C |
| 3,737,615 | 6/1973 | Bell | 219/69 C |
| 3,739,136 | 6/1973 | Maaendaz | 219/69 C |
| 3,745,298 | 7/1973 | Malesh | 219/69 C |
| 3,767,886 | 10/1973 | Sennowitz | 219/69 C |
| 3,789,182 | 1/1974 | Verner | 219/69 C |
| 3,809,847 | 5/1974 | Bell | 219/69 C X |
| 3,875,362 | 4/1975 | Balleys | 219/69 C |
| 3,912,898 | 10/1975 | Pfau | 219/69 M |
| 3,973,104 | 8/1976 | Ullmann et al. | 219/69 C |

OTHER PUBLICATIONS

Mano, "Computer Logic Design," Prentice-Hall, 1972, pp. 1-4.
FIG. 2, IMP-16C Microprocessor Simplified Block Diagram, Application Manual, Nat'l. Semicond. Corp.

Primary Examiner—Bruce A. Reynolds
Attorney, Agent, or Firm—Harry R. Dumont

[57] ABSTRACT

A system for controlling an electrical discharge machining apparatus in which there is an electronic output switch connected between a power source and an electrical discharge machining gap for providing to the gap machining power pulses of predetermined on-off time. The system further includes a current limiting stage for limiting the peak current provided to the gap at certain critical combinations of on-off time ratios so that possibility of gap short circuiting is substantially eliminated. This system further includes a programmable computer operable to receive a plurality of operator provided and memory stored data inputs, including one for controlling pulse on-time and the other as a current limiting signal for the current limiting stage. The system further includes a reference signal and a signal network connected to the gap for providing a feed-back of a gap voltage signal. These two aforesaid signals are processed to provide an off-time control signal whereby the off-time is suitably controlled in response to changes in gap voltage. The system further includes a means for controlling in an automatic fashion the servo-feed system of the apparatus responsive to the gap voltage signal.

11 Claims, 4 Drawing Figures

ADAPTIVE CONTROL SYSTEM AND METHOD FOR ELECTRICAL DISCHARGE MACHINING

REFERENCE TO RELATED APPLICATION

This application is a continuation-in-part of Application Ser. No. 475,573, filed June 3, 1974, for "Adaptive Control System and Method for Electrical Discharge Machining" now abandoned.

BACKGROUND OF THE INVENTION

A complete system for adaptive control of electrical discharge machining has long been sought after. Different forms of partial adaptive control have been offered in commercial equipment in which, for example, one of the parameters of machining, such as machining pulse on-time or off-time, may be controlled by a feed-back signal from the gap. One example of a circuit in which on-off time control is exercised in response to gap voltage parameters is disclosed and described in my U.S. Pat. No. 3,705,969 issued on Dec. 12, 1972 for "Cut-Off Protection System for Electrical Discharge Machining Power Supply." Others incorporated systems in which, for example, peak current was limited in a system in which according to the preset frequency and on-time there were switched in one or more series resistors which operate to control the peak current magnitude applied during the particular machining operation. One example of a system of this type is shown in U.S. Pat. No. 3,737,615 issued on June 5, 1973 for "Current and Frequency Control system for Electrical Discharge Machining Apparatus."

A precision operating adaptive control system necessarily takes a number of control data inputs, whether these be from a manual input operated by the machine operator from a keyboard, thumbwheel switch, or from an operator encoded punch card, magnetic tape, or any other information carrier and reader known and now commercially in use. It is important that these inputs are of at least two types, including one for selecting surface finish and another for selecting wear ratio. Both of these inputs are related to the particular pulse on-time which is desirable for any selected combinations of material in the electrode and workpiece setup. The inputs may be entered manually by the operator into a control input device as the result of his own experience in earlier electrical discharge machining operations which he himself has run or, alternately, may be the result of a relatively great number of prior machining operations on which empirical data has been accumulated in a memory file relative to the surface finish, wear ratio and corresponding on-times most appropriate for a large number of different workpiece and electrode combination.

In the memory file controlled system of the present invention, this data is contained in a basic operating program and is available on demand to provide through a data select signal input for the programmable computer, which in turn will then select and control the proper parameters for operation of the digital type multivibrator, which in turn controls the on-off time or the off-time of the electronic output switch or switches in the system.

It will be understood in the specification that when I refer to "electronic switch" I mean any electronic control device having three or more electrodes comprising at least two principal or power conducting electrodes acting to control current flow in the power circuit, the conductivity between the principal electrodes being controlled by a control electrode within the switch whereby the conductivity of the power circuit is controlled statically or electrically without movement of mechanical elements within the switch. Included within the definition are transistors in which turn-on is accomplished by a control voltage applied to the transistor control electrode and in which turn-off is accomplished automatically in response to removal of that control voltage. Also included in the definition are devices of the gate type in which turn-on is accomplished by a control voltage applied to the control electrode, which control voltage may be then removed and in which turn-off is accomplished by application of a subsequent control voltage to the control electrode. An additional class of electronic switches, called "electronic trigger devices," falls within this definition and includes ignitrons, thryatrons, semi-conductor controlled rectifiers and the like. By "electronic trigger device" I mean any electronic switch of the type which is triggered "on" at its control electrode by a pulse and is turned "off" by a reverse voltage applied for a sufficient time across its principal electrodes.

It will be understood that the present system will operate effectively only when there is included in the EDM power supply a pulse generator of the digitally controlled type, preferably including a counter and a digital control system such as the type shown and described in my U.S. Pat. No. 3,809,847 for "Method and Apparatus for Electrical Discharge Machining" issued May 7, 1974. In that patent, there is shown a system whereby the desired on-time and off-time can be separately dialed by the operator on decimal-type thumbwheel switches, which switches then furnish a continuing visual indication of the on-off times of the machining operation then being carried on. Such a digital-type pulse generator is particularly suitable for incorporation with the system of the present invention.

BRIEF DESCRIPTION OF THE INVENTION

The present invention thus further includes a provision for feed-back signals representative of gap current or gap voltage, which signals are further utilized in the programmable computer stage of the system to influence and control the off-time and other parameters of the machining operation.

In the system, it is further desirable that the servo control system, which controls relative movement of tool electrode relative to workpiece, likewise be made to respond promptly to changing gap conditions, thus to compensate for gap short circuit conditions or other conditions just preceding gap short circuit in which the gap is being bridged by unremoved particles or contaminants To this end, the system includes a gap voltage sensing network which responds to gap voltage and passes a gap voltage signal through an analog to digital converter, which in turn serves as an input appropriate to be handled by the programmable computer. The servo control system is then provided with an output signal which is converted through a suitable digital to analog converter section to finally provide a control signal to the servo system valve which then controls the upfeed or downfeed of the servo system.

A further important factor handled by the adaptive control system in accordance with the present invention is the current limiting system in which, according to predetermined upper limit, there is provided a maximum peak current for each different frequency and on-off time combination in such manner as to help to prevent DC arcing or gap short circuit when the parameters selected might reach a dangerous limit.

Thus it will be seen that the present invention provides an adaptive control system for electrical discharge machining which after initial setting of the conditions desired maintains the system parameters within reasonable and safe limits to perform the operation desired by the operator. The programmable computer and certain of its parts form an important element of the system and provide both a mathematical capability and a decision making logic.

BRIEF DESCRIPTION OF THE DRAWINGS

The present invention, its operational features and its advantages and objectives, will be understood from the following specification taken together with the drawings wherein.

DETAILED DESCRIPTION OF THE PREFERRED EMBODIMENT

Figure 1:
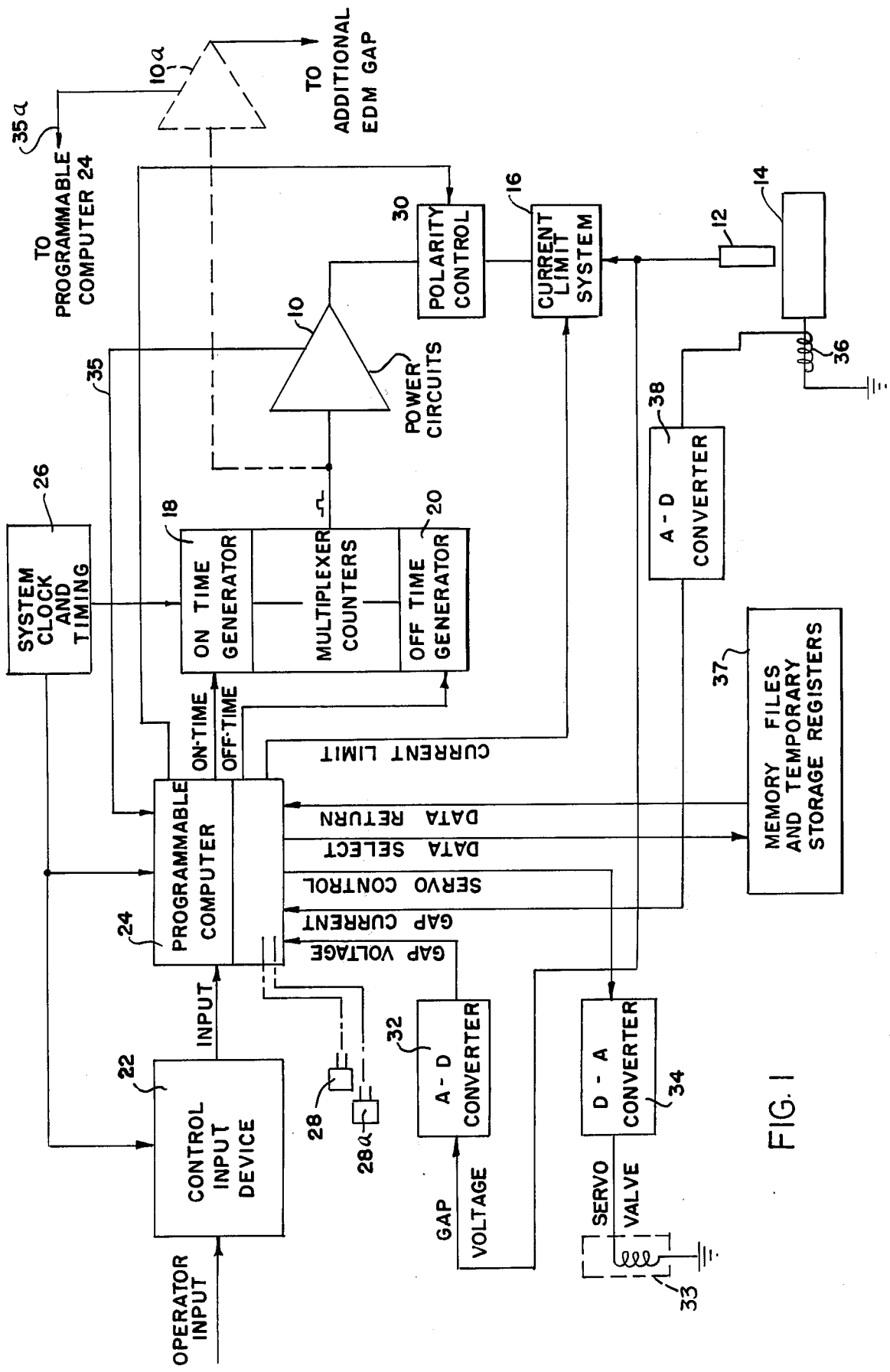
FIG. 1 is a combined block diagrammatic and schematic showing of the invention.

FIG. 1 shows the basic parts of an adaptive control system for electrical discharge machining in which a plurality of power circuits 10 and 10a are used to provide machining power pulses to one or more EDM gaps. Each gap normally includes a tool electrode 12 and a workpiece 14 to which machining power pulses are provided by the power circuits 10. In each case the power circuits 10 include one or more transistors or other electronic switches suitably connected between a DC power source and the gap, with the switches in the power circuit receiving controlled triggering pulses to turn them on and off and thus control the on and off time of the machining power pulses being furnished to the gap. In the interest of brevity and simplification, repetition of the detail of the power circuits is not made in this application. A simplified showing of one such power circuit is shown and described with respect to FIG. 1 of my U.S. Pat. No. 3,737,615. It will be understood that for certain combinations of electrode and workpiece, such as for example one in which graphite is used as a tool electrode, the polarity of the tool electrode 12 will be positive relative to the workpiece 14. This represents the reverse of the normal machining polarity with the tool electrode 12 negative and the workpiece 14 positive.

A current limit system 16 is connected intermediate the output of the power circuits and the gap in such manner as to provide a limit in magnitude of peak machining current, which limit in each case is a function of the particular frequency, i.e. on-off time combination, at which the machining operation is being carried out. The detail of the construction and a complete description of the operation of such a current limit system is likewise contained in my aforementioned U.S. Pat. No. 3,737,615 and the contents of the specification of that patent are incorporated by reference in this application. As shown in FIG. 1, triggering pulses are generated through a digital multivibrator which includes a separate on-time generator 18 and an off-time generator 20, and the triggering pulses are suitably shaped and amplified, usually through one or more intermediate drive stages, until they are finally used to turn on and turn off the switches in the power circuits 10 and 10a with the on-off times required. The digital multivibrator, with its included on-time generator 18 and off-time generator 20, may preferably be of the type shown and described in detail in my aforementioned U.S. Pat. No. 3,809,847, particularly in FIGS. 4 and 5 thereof. In that patent, there is shown a system in which there are separate on-off time generators, each controlled by an associated separate presettable counter for precision digital control of the exact timing of both on-time and off-time durations.

With further reference to the showing of FIG. 1, there is further provided a control input device 22 and a programmable computer 24. The entire system receives clock pulses from a system clock and timing source 26. It will be understood that the programmable computer 24 is one provided with a defined instruction set giving it the capability of providing logic, memory and arithmetic functions and may, by way of example, be embodied as Model IMP-16C Microprocessor currently manufactured and sold by National Semiconductor Corporation of Santa Clara, California. Such microprocessors, as well as many minicomputers, are readily available commercially and could be utilized by those skilled in the electronic and computer arts. The programmable computer 24 will be described in more detail in connection with FIG. 4 hereinafter. Input to the system and to the programmable computer 24 is made through a control input device 22 operated manually by the operator. The operator input might typically be through an input keyboard, thumbwheel switches, punch tape, punch cards, magnetic tape or the like, on which the operator enters the desired control data. Initiation of the load cycle would be made by the contact of a cycle start button 28 on the machine tool. At the same time, the programmable computer 24 would load the inputs from the operator and go into a mathematical computing condition to determine if the combinations which have been entered for on-off time, current limit and the like are valid. Values for on-off ratio and values for maximum frequency corresponding to various current limit settings would be stored also for the system. These stored values would be retained in the memory files 37 of the programmable computer 24.

Upon receiving a cycle start input signal from the cycle start button 28, the programmable computer 24 would first determine the maximum frequency by going to a stored value in memory file 37 and comparing the current limit setting with that made by the operator. It will be understood that the off-time can be changed at any time because after every servo and cut-off cycle it will be read and compared with the last entered off-time. On the other hand, the on-time and current limiting level cannot be changed at will after the cutting cycle is started but can be changed only by operating the enter data button 28a on the power supply even though the cutting may be in progress or uncycling the machine tool and restarting. The programmable computer 24 will additionally determine if the polarity as preset by the polarity control system 30 has been changed. If the polarity has not been changed, the programmable computer 24 will recompute new ratios and go on cutting with new parameters. If the polarity has been changed, the programmable computer 24 will shut down the machine, wait for the DC power supply to discharge, then change polarity, recompute new values, and resume cutting. The parameters which may be changed at will are off-time and servo reference gap voltage. The parameters that can be changed only by using the enter data button 28a are on-time, current limiting, capacitor value and polarity. Each time any of these latter values is changed, a computation of new values must be made.

It will be seen that a considerable advantage from this system results in that the system operating parameters, such as percent of duty cycle, new frequency for current limiting and the like, can be changed and controlled without changing hardware. These are handled as readily controllable software functions.

Also included in the adaptive control system are those elements which control the servo-feed operation of the electrode 12 relative to the workpiece 14. It is necessary that relative movement be maintained as between electrode 12 and workpiece 14 through a suitable servo-feed motor. In this manner, an optimum machining gap can be maintained at all times for continuous cutting. The servo-feed system again is controlled through the programmable computer 24. An analog to digital converter 32 is connected to the gap to pick up a signal representative of gap voltage and provide it as an input for comparison with the servo reference voltage preset in the programmable computer 24. The servo control output itself is passed through a digital-analog converter 34 as shown. Analog to digital converter 32 and digital to analog converter 34 are well known to the electronic art and to those skilled in that art. Examples of such converters are shown in such publications as "Sourcebook of Electronic Circuits" by John Markus, published by McGraw-Hill, Inc. 1968. If the gap voltage level is higher than the level programmed, it will, for example, send a 1 millisecond pulse to the servo-feed system to initiate its control through a servo valve 33. In the event the gap voltage is lower than the level programmed, it will send a different 1 millisecond signal to the circuit thus commanding it to retract. The repeat cycle on this process is approximately 1kHz so that in effect the value sees a DC voltage. The cut-off system in accordance with the operation of the programmable computer 24 is unique in that for every possible setting of off-time in the off-time generator 20 there is provided a stored set of off-time values of about 10 in number. When an off-time is computed, it is multiplied by two and stored remultipled by two and stored, until finally a total of 10 values are stored. For example, with an off-time equal to 5 microseconds, the following stored values would be provided:

Off-time = 5 $\mu$s

Factor 2 = 10 $\mu$s; 20 $\mu$s; 40 $\mu$s; 80 $\mu$s; 160 $\mu$s; 320 $\mu$s; 640 $\mu$s; 1280 $\mu$s; 2560 $\mu$s; 5120 $\mu$s.

Figure 2:
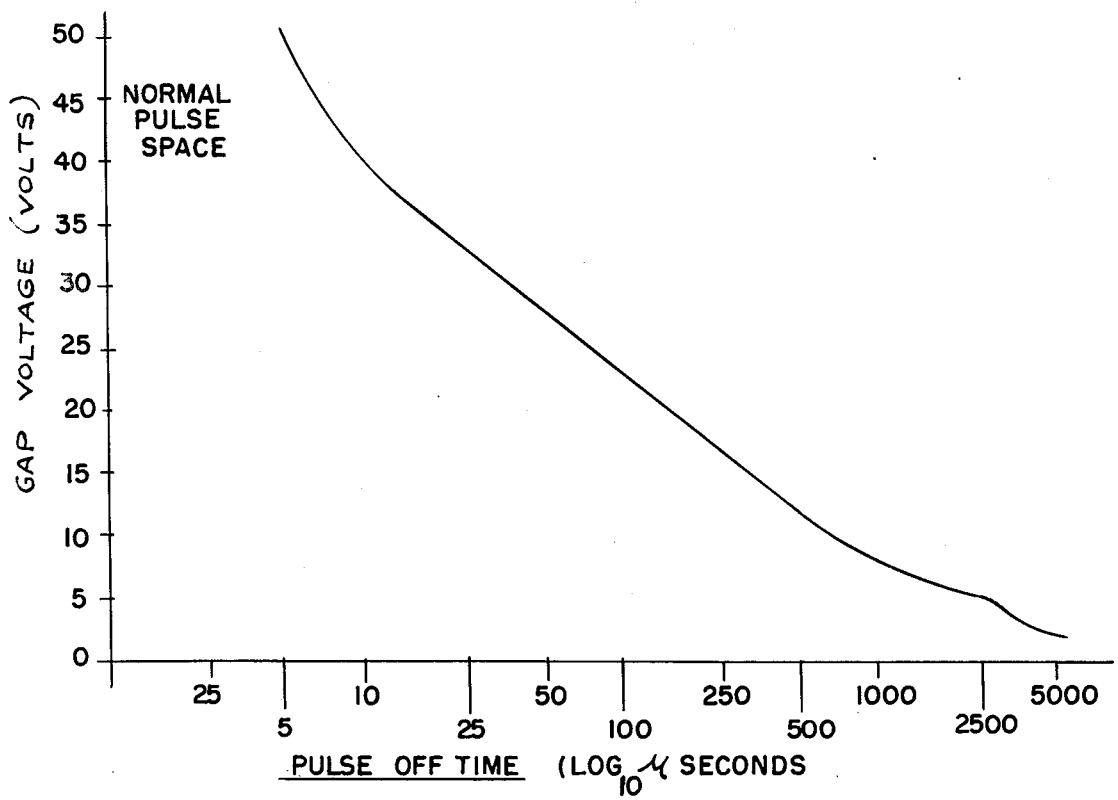
FIG. 2 is a diagram showing the relationship between gap voltage level and appropriate pulse off-time.
Figure 3:
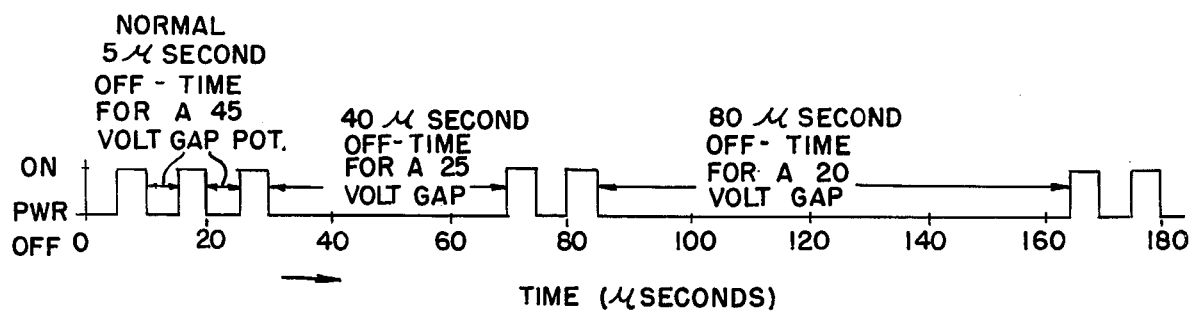
FIG. 3 is a pulse waveform diagram illustrating the operation of the apparatus.

As the gap voltage is monitored and compared with the preset ratios of gap voltage, the new cut-off off-time is entered in the off-time generator 20. For example, with an off-time of 5 microseconds for normal cutting range of 40-50 volts, the following cut-off off-times which would be provided for the different gap voltage values which might occur:

Voltage:
35 – 40: 10 $\mu$s
30 – 35: 20 $\mu$s
25 – 30: 40 $\mu$s
20 – 25: 80 $\mu$s
15 – 20: 160 $\mu$s
10 – 15: 320 $\mu$s
7 – 10: 640 $\mu$s
5 – 7: 1280 $\mu$s
3 – 5: 2560 $\mu$s
0 – 2: 5120 $\mu$s Reference is now made to the gap voltage plot of FIG. 2 and the pulse waveform drawing of FIG. 3. For example, as the voltage of the gap drops to around 20 volts, there would be provided an off-time of around 80 microseconds, as shown in FIG. 2. The resumption of normal operation would give the normal on-off times of fives microseconds in the following right hand pulse shown in FIG. 3. Again, as the gap voltage approaches the level of 10 volts, there would be provided a greatly increased off-time of 320 microseconds as approximated by the showings of FIGS. 2 and 3. In this manner, there is substantially greater current limiting as the voltage drops successively occur at the gap.

Figure 4:
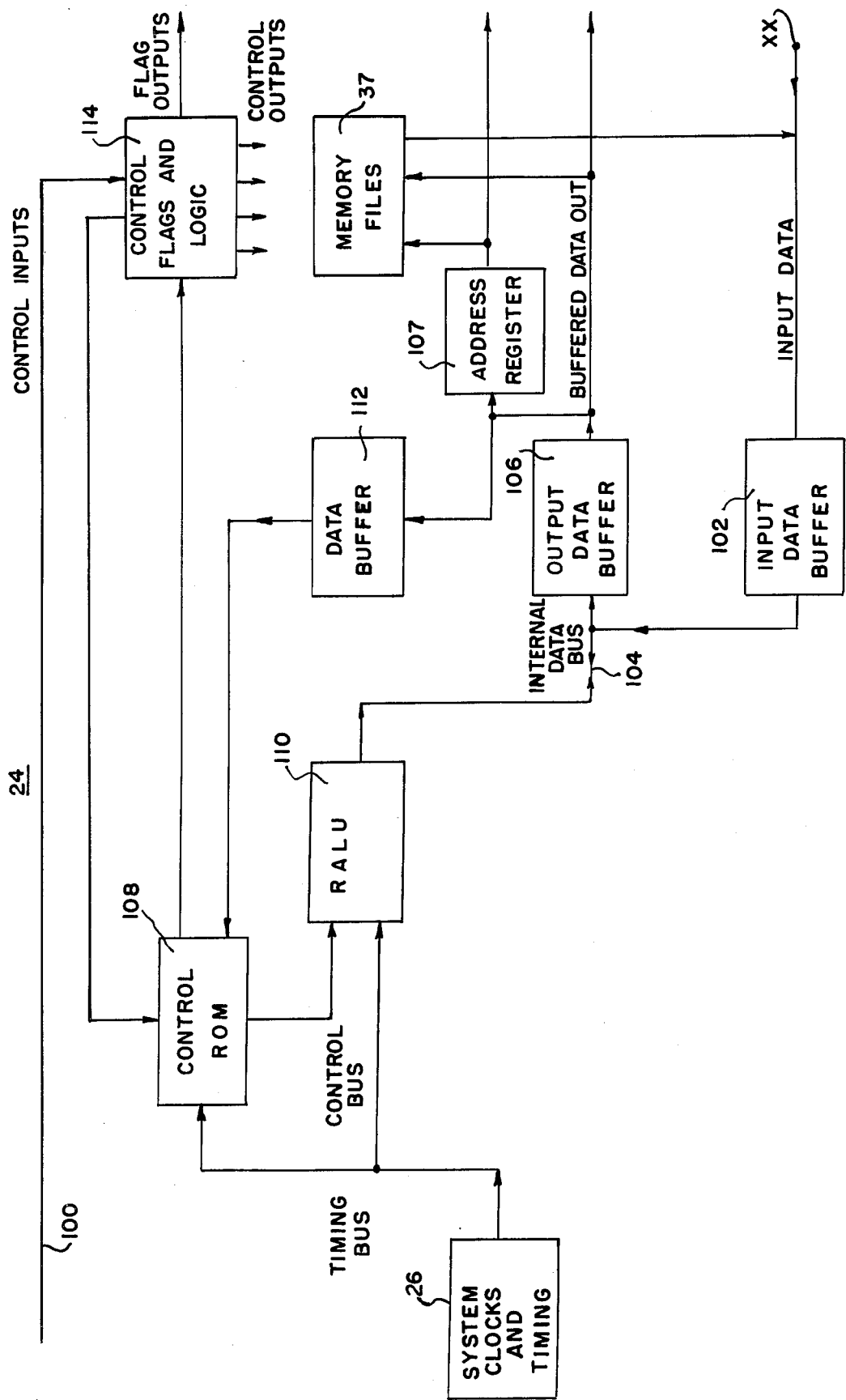
FIG. 4 is a block diagrammatic showing of the programmable computer and its basic operating parts.

Reference is now made to FIG. 4 and the simplified block diagrammatic showing of the programmable computer 24 which is embodied as a microprocessor. The main components include the system clock and timing system 26 and the memory files 37 already shown in connection with FIG. 1. It will be understood that there may be provided a common system clock and timing 26 which operates not only the programmable computer 24 but also the additional elements of the circuit, such as the on-time generator 18 and off-time generator 20. Control inputs to the programmable computer 24 are provided at the upper left hand corner of the drawing through an input lead 100. These control inputs may include, for example, interrupt signals or the signal inputs from data entry button 28a of FIG. 1. At terminal XX provision is also made for receiving input data from peripheral units, for example, from the control input device 22. Alternately, input data is received from the memory files 37 of the computer or from external memories added to the system. This incoming data is received and passed to an input data buffer stage 102. A bidirectional data bus 104 connects the register and arithmetic logic unit (RALU) 110 to the data bus. Both addresses and data are transferred from the data buffer stage 102 over the buffered output data stage 106. The buffered data output is carried to the pins on the card edge connector to perform the function of transferring data to the current limit system 16, the on-time generator 18, the off-time generator 20, the polarity control 30 and the servo 33. Addresses are also routed to the memory 37 through an address register 107. Communication is provided between a control read-only memory stage 108 and the RALU 110 over a control bus. The operations of the system are controlled by the control read-only memory (CROM) 108. This control is effected by routines which constitute the microprogram stored in the read-only memory of the CROM 108. The microprogram effects the implementation of microinstructions which comprise the instructions set for the programmable computer. It will be understood that the RALU 110 makes up the arithmetic section of the programmable computer 24.

A further data buffer stage 112 is inclined intermediate the output data buffer stage 106 and one input terminal for the CROM 108. The control flags and conditional jump multiplexer 114 has a plurality of flag outputs and additional control outputs. The detailed mode of operation and timing cycles, decoders and the like for the programmable computer 24 are described and explained in detail in the publication "IMP-16C Application Manual," dated January 1974, published by National Semiconductor Corporation of Santa Clara, California. In the interest of brevity and conciseness, that material which is well knwon to those skilled in the computer arts will not be reproduced here.

The programmable computer 24 also includes provision in each power module protecting against output transistor failure which might occur in one or more of the power circuits 10, 10a. While FIG. 1 includes the detailed showing of a single output module and single power circuit 10, it is frequently necessary to provide a number of output modules, 10, 10a and still others, which may be paralleled for high amperage operation in cutting or used separately for EDM machining with different electrodes or different electrode segments in a multiple or a split-type EDM operation. It is important that in the event the transistor or other electronic switch used should fail in one of the output power circuits 10, 10a, the programmable computer 24 should appropriately control the power supply output. In the event of a failure, the programmable computer 24 would receive a signal from a module status line 35 or 35a, and would then provide a data selector control signal to the memory files 37 in which a failure analysis program is prestored. Typically, a failure analysis program would provide a turn-off cycle, read successively all of the module status lines, such as status line 35 or 35a, to determine which module is in a fail condition, display the location of the fail module on the front panel of the power supply typically through a set of module status lights, and then turn off the failed module in expectation of a cycle start signal from the operator by the actuation of the cycle start button 28 on the machine tool. The operator would then observe the number of failed output modules and increase to an appropriate degree the current limit setting in the remaining good modules and then recycle, therefore continuing the cut even though several bad modules might be present in the power supply. In this manner, the failed output modules or power circuits 10, 10a would not be turned back on until the machine is completely shut off. When the power supply is again turned on and recycled, for example, on the next following day, an indication of the failed module or power circuit 10, 10a lines would reappear and the modules would again be turned off by the programmable computer 24. In an exemplary type of operation, as follows, the operator input would be equal to a particular current setting limit, the memory files 37 would contain a frequency setting for that current setting limit, which, for example, might be 100 kHz:

Then $T = (1/F) = (1/100 \text{ kHz}) = 10 \mu s$

Comparison would next be made in the programmable computer 24 to the operator entered input for the on-time which, for example, might have been 9 microseconds. The operator has entered and is primarily concerned with such gap parameters as over-cut and finish for which on-times and current limit settings are the determining factors. The programmable computer 24 would not change these. However, the programmable computer 24 would then take T as equal to 10 microseconds and substract the operator input nine microseconds, with the remainder of 1 microsecond. It would then take the operator on-time entered and calculate the minimum off-time to provide an on-off ratio of 8:1 or 1.25 microseconds rounded off to 2 microseconds. The programmable computer 24 would then compare the operator off-time imput which may have been 5 microseconds with the calculation of 1 microsecond and 2 microseconds and finally take the largest value for the operation off-time. Alternately, the operator could let the programmable computer 24 calculate the off-time for him by entering zero. The operation of off-time in that case would have been 2 microseconds. Exemplary cycle times used in EDM machining are as follows:

Cut-off: 0.2 ms
Servo: 0.100 ms
Transistor fail: 20 μs

The system of FIG. 1 further includes a gap current sensing transformer 36 which is used to provide an output representative of gap current level through an analog to digital converter 38, which in turn has its output provided to the programmable computer 24.

It will thus be seen that I have provided through my invention an improved adaptive control system for electrical discharge machining, including among other novel features an improved programmable computer system which uses both operator provided inputs and memory file data inputs to appropriately control and to adjust important gap operating parameters throughout an electrical discharge machining operation.

What is claimed is:

1. In an electrical discharge machining apparatus including an electronic output switch operably connected between a power source and an EDM gap including an electrode and a workpiece for providing machining power pulses thereto, a current limiting system operably connected to the output switch for limiting the peak current of the machining power pulses being furnished to the gap, a digital pulse generator having controllable on and off times and a servo-feed system, wherein the improvement comprises:
   a data input stage operably connected to the gap;
   a memory file unit for storing previously accumulated control input data for like EDM operations; and
   a programmable computer operably connected to and controlling said pulse generator, said programmable computer including a read-only memory unit, said programmable computer operable to determine maximum frequency of operation of the pulse generator responsive to difference between data transferred from said memory unit to said read-only memory unit and data entered into said memory unit from said gap data input stage, whereby maximum frequency is controlled with respect to current limit setting.

2. The combination as set forth in claim 1 wherein said servo-feed system is further subject to control by said programmable computer and wherein an analog-digital converter is connected intermediate the gap and the computer for deriving a signal from the gap and comparing it with a servo preset reference voltage in said computer, said computer operable to send a down-feed signal to the servo-feed system responsive to a condition of gap voltage higher than the preset reference voltage, said computer further operable to send a withdrawal signal to the servo-feed system responsive to the gap voltage being lower than the preset reference voltage.

3. The combination as set forth in claim 1 wherein a plurality of EDM gaps and electronic switches are included for providing multiple gap machining operation, and wherein a separate module status line is connected intermediate each of said gaps and said programmable computer for providing a fail signal in response to failure of an associated electronic output switch in any one of said gaps, said programmable computer operable to initiate the operation of a failure analysis and display program responsive to receipt of such fail signal.

4. The combination as set forth in claim 1 wherein said servo-feed system includes an electrically operated control device operable responsive to difference occurring between a reference voltage level stored in said programmable computer and a voltage level sensed at the gap.

5. The combination as set forth in claim 1 wherein there is connected operably to the gap a polarity control stage for selectively presetting the polarity of the electrode relative to the workpiece in response to a further control signal provided from said programmable computer.

6. The combination as set forth in claim 1 wherein there is provided a common clock pulse source for timing the operation of the programmable computer and the on-off time operation of said pulse generator, respectively.

7. An adaptive control system for electrical discharge machining including a programmable computer and means for controlling the on-time and for controlling the off-time of machining power pulses provided to an EDM gap including a tool electrode and a workpiece, the improvement comprising:

manual input means for entering on and off-time data and data for thus providing a current limit for each such on-off time data setting;

memory means for storing empirical data for each on-off time and current limit data corresponding to data provided from said manual input means; and means for limiting the on-off times and accordingly the current limit to the limit of such data stored in said memory means.

8. The combination as set forth in claim 7 wherein a feedback means is provided from the gap to provide a modifying control signal for increasing the off-time provided by said manual input means for the duration of the continuation of gap voltage below a predetermined reference level provided by said manual input means.

9. The combination as set forth in claim 7 wherein a gap polarity control means is operatively connected to said EDM gap, said manual input means operable to provide a polarity control means for initiating and controlling the operation of said polarity control means.

10. The combination as set forth in claim 7 wherein a plurality of progressively increasing off-time settings are provided for each different off-time entered through said manual input means.

11. The combination as set forth in claim 10 wherein for each incrementally different voltage level occurring at the gap there is provided a different precomputed value of off-time with respect to the machining power pulses.

* * * * *